(12) United States Patent
Chen et al.

(10) Patent No.: US 7,595,751 B2
(45) Date of Patent: Sep. 29, 2009

(54) METHOD FOR CROSSLINKING MULTIPLE GPS DEVICES

(75) Inventors: Po-Ju Chen, Taipei (TW); Wen-Hung Hsu, Taipei (TW); Hsin-Hsin Chu, Taipei (TW)

(73) Assignee: Luff Tech Co., Ltd., Taipei (TW)

( * ) Notice: Subject to any disclaimer, the term of this patent is extended or adjusted under 35 U.S.C. 154(b) by 0 days.

(21) Appl. No.: 12/047,413

(22) Filed: Mar. 13, 2008

(65) Prior Publication Data

US 2009/0160702 A1    Jun. 25, 2009

(30) Foreign Application Priority Data

Dec. 21, 2007   (TW) .............................. 96149262 A

(51) Int. Cl.
*G01S 1/02* (2006.01)
*G01S 5/14* (2006.01)

(52) U.S. Cl. .............................. 342/357.08; 342/357.09

(58) Field of Classification Search ............ 342/357.01, 342/357.06, 357.07, 357.08, 357.09; 701/213, 701/215; 455/456.2, 457

See application file for complete search history.

(56) References Cited

U.S. PATENT DOCUMENTS

| 6,323,980 | B1 * | 11/2001 | Bloom ....................... 398/129 |
| 7,379,673 | B2 * | 5/2008 | Krill et al. .................. 398/118 |
| 2008/0044187 | A1 * | 2/2008 | Krill et al. .................. 398/121 |

* cited by examiner

*Primary Examiner*—Dao L Phan
(74) *Attorney, Agent, or Firm*—Rosenberg, Klein & Lee

(57) ABSTRACT

A crosslinked positioning method sets one of the intercommunicated positioning devices as a master and the remaining ones as slaves through a crosslink allocation. The method includes the steps of searching several devices at the same time, receiving IDs and comparing the IDs. The device with a higher ID is a master, and the other devices with a lower ID are slaves. The master and slaves perform a data link through a search mode, a call mode, a frequency hopping mode, a transmission power adjusting mode or a correction time mode. After the data link is accomplished, positioning data of the master and the slaves are displayed simultaneously on a screen.

18 Claims, 20 Drawing Sheets

Searching Slave command

| Data Length | Device Type | Deivce ID | Searching Slave Field | Slave ID | Master Slot | Master Data Num | GPS Fix or Not | Working Channel | Working Slot |
|---|---|---|---|---|---|---|---|---|---|

FIG.4(a)

Searching Slave Responses command

| Data Length | Device Type | Deivce ID | Searching Slave Responses Field | Slave Slot | Slave Data Num | GPS Fix or Not |
|---|---|---|---|---|---|---|

FIG.4(b)

Searching Slave OK command

| Data Length | Device Type | Deivce ID | Searching Code | Slave ID | Master Slot | Master Data Num | GPS Fix or Not |
|---|---|---|---|---|---|---|---|

FIG.4(c)

Normal Code Slave

| Data Length | Device Type | Deivce ID | Normal Code Slave Field | Longitude | Latitude | PA Level | Slave Channel | Slave Slot | Slave Data Num | GPS Fix or Not |
|---|---|---|---|---|---|---|---|---|---|---|

FIG.6(a)

Slave Calling Master

| Data Length | Device Type | Deivce ID | Slave Calling Master | Longitude | Latitude | Slave Channel | Slave Slot | Slave Data Num | GPS Fix or Not |
|---|---|---|---|---|---|---|---|---|---|

FIG.6(b)

Normal Code Master

| Data Length | Device Type | Deivce ID | Normal Code Slave Field | Master Channel | Master Slot | Master Data Num | GPS Fix or Not |
|---|---|---|---|---|---|---|---|

FIG.6(c)

Slave Calling Master OK

| Data Length | Device Type | Deivce ID | Slave Calling Master ok Field | Slave Channel | Slave Slot | Slave Data Num | GPS Fix or Not |
|---|---|---|---|---|---|---|---|

FIG.9

Channel and Slot Hopping

| Data Length | Device Type | Deivce ID | Hopping Code | Master Channel | Master Slot | Master Data Num | Next Channel | Next Slot | GPS Fix or Not |
|---|---|---|---|---|---|---|---|---|---|

FIG.11(a)

Channel and Slot Hopping Responses

| Data Length | Device Type | Deivce ID | Channel and Slot Hopping Responses Field | Slave Channel | Slave Slot | Slave Data Num | GPS Fix or Not |
|---|---|---|---|---|---|---|---|

FIG.11(b)

Channel and Slot Hopping OK

| Data Length | Device Type | Deivce ID | Channel and Slot Hopping ok Field | Master Channel | Master Slot | Master Data Num | GPS Fix or Not |
|---|---|---|---|---|---|---|---|

FIG.11(c)

Slave PA Adjust

| Data Length | Device Type | Deivce ID | PA Adjust | Master Channel | Master Slot | Master Data Num | Slave ID | PA Level | GPS Fix or Not |
|---|---|---|---|---|---|---|---|---|---|

FIG.13(a)

Slave PA Adjust Responses

| Data Length | Device Type | Deivce ID | Slave PA Adjust Responses Field | Master Channel | Master Slot | Master Data Num | GPS Fix or Not |
|---|---|---|---|---|---|---|---|

FIG.13(b)

Slave PA Adjust OK

| Data Length | Device Type | Deivce ID | Slave PA | Master Channel | Master Slot | Master Data Num | Slave ID | GPS Fix or Not |
|---|---|---|---|---|---|---|---|---|

FIG.13(c)

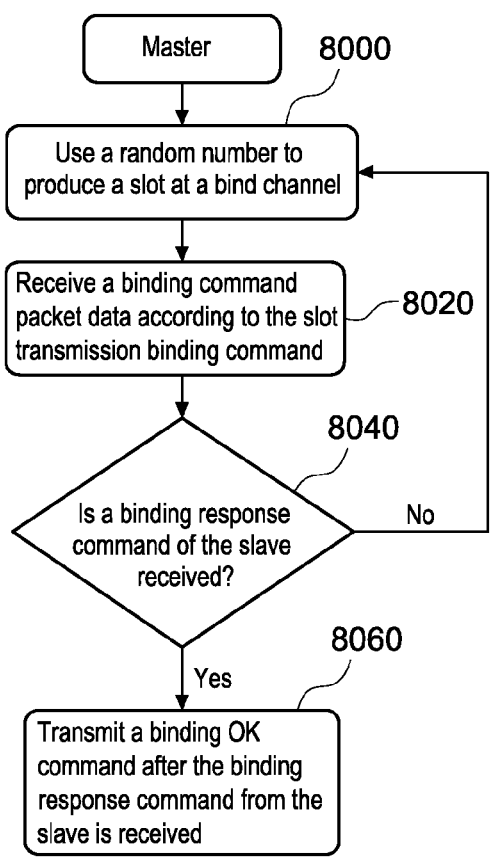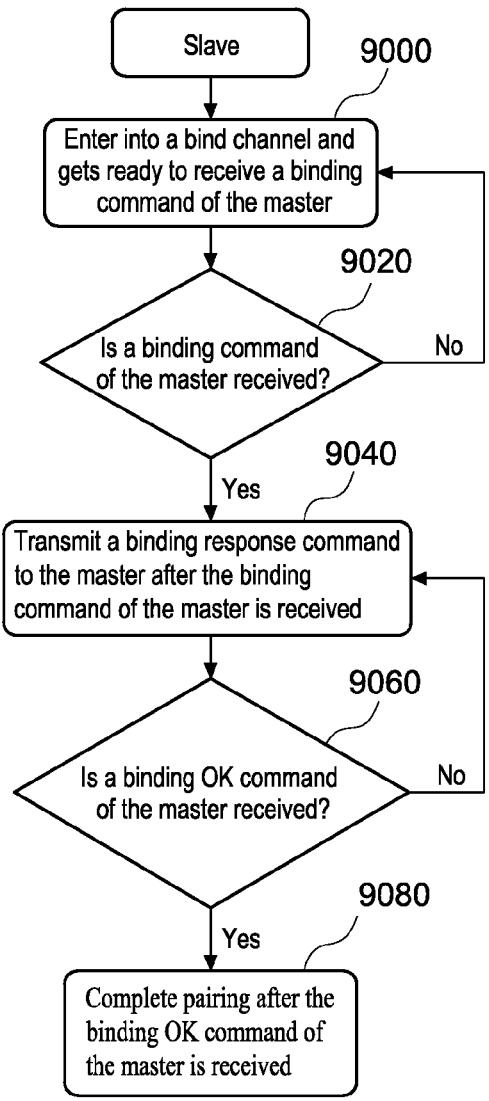
FIG.18(a)
FIG.18(b)

Binding command

| Data Length | Device Type | Deivce ID | Binding Field | Master Slot | Master Data Num | Working Channel | Working Slot | GPS Fix or Not |
|---|---|---|---|---|---|---|---|---|

FIG.19(a)

Binding Responses command

| Data Length | Device Type | Deivce ID | Binding Field Responses | Slave Slot | Slave Data Num | GPS Fix or Not |
|---|---|---|---|---|---|---|

FIG.19(b)

Binding OK command

| Data Length | Device Type | Deivce ID | Binding ok Field | Master Slot | Master Data Num | GPS Fix or Not |
|---|---|---|---|---|---|---|

FIG.19(c)

METHOD FOR CROSSLINKING MULTIPLE GPS DEVICES

BACKGROUND OF THE INVENTION

1. Field of the Invention

The present invention generally relates to a global positioning system, and more particularly to a crosslinked positioning method for multiple users.

2. Description of Prior Art

Taking a trip or climbing a mountain has become one of the best leisure activities, and thus families, friends, and companies enjoy their getting together for outdoor activities during weekends or holidays. As economy and technology advance, cars are primarily used as a transportation means for outdoor activities, and multiple cars are usually teamed up to form a car team for the activity.

In general, when a car team sets off, each car of the team is equipped with a walkie-talkie or a mobile phone for communications to prevent any car from leaving behind or getting lost, or a satellite navigation system is provided for guiding the cars to the destination. Although walkie-talkies and mobile phones can be used for the coordination among cars, each driver has to watch the rear mirror from time to time and make sure that each car follows closely. If any car is left behind, the car in the front is informed to pull aside of the road and wait for the coming car, or notice the car left behind by walkie-talkies. However, such arrangement is very inconvenient, and may even cause an accident easily. Even though the car left behind can be guided to the destination by a satellite navigation system, the satellite navigation system used in a car usually allows users to locate their own position only, but not the positions of other cars or the distance of their car from others cars of the team.

In addition, disasters in mountain usually occur when a mountain climber gets lost in an unfamiliar mountain path or injured. For disasters in mountain, mountain climbers or victims are unable to inform rescuers immediately or tell the rescuers about their exact location, and they have to wait for rangers to find them after they have not returned at a specific time, and then the rescue team is informed. During a rescue, the rescuers have difficulties of locating the mountain climbers and victims who are in danger, and the rescuers have to search the whole mountain which may take lots of time and delay the time of rescuing the mountain climbers.

SUMMARY OF THE INVENTION

Therefore, it is a primary objective of the present invention to redesign the traditional positioning device, wherein several intercommunicated positioning devices of the same type are combined by a cross allocation, and one of the positioning devices is a master, and the remaining ones are slaves. During its application, both of the master and the slave can show their positions as well as the positions of others. In the meantime, the intercommunicated positioning device can transmit an emergency rescue signal to all users who hold the same kind of intercommunicated positioning devices to inform them about the signal transmitting position.

To achieve the foregoing objective, the present invention provides a crosslink communication positioning method for setting one of the intercommunicated positioning devices as a master and the remaining ones as slaves by a crosslink allocation. The method comprises the steps of searching a plurality of devices at the same time, searching a plurality of IDs, and comparing the IDs. The device with a large ID is the master, and the device with a small ID is a slave. The master and the slave perform a data link including a search mode, a call mode, a frequency hopping mode, a power transmission adjusting mode and a correction time mode. After the data link is completed, related positions and distance of the master and slaves are displayed simultaneously on a map displayed by the intercommunicated positioning device.

BRIEF DESCRIPTION OF DRAWINGS

FIG. 4(*a*) is a schematic view of a searching slave instruction packet data in accordance with the present invention;

FIG. 4(*b*) is a schematic view of a searching slave replay instruction packet data in accordance with the present invention;

FIG. 4(*c*) is a schematic view of a searching slave OK instruction packet data in accordance with the present invention;

FIG. 6(*a*) is a schematic view of a slave normal code packet data in accordance with the present invention;

FIG. 6(*b*) is a schematic view of a slave calling master packet data in accordance with the present invention;

FIG. 6(*c*) is a schematic view of a normal code master packet data in accordance with the present invention;

FIG. 9 is a schematic view of a slave calling master OK packet data in accordance with the present invention;

FIG. 11(*a*) is a schematic view of a channel and a slot frequency hopping packet data in accordance with the present invention;

FIG. 11(*b*) is a schematic view of a channel and a slot frequency hopping packet reply data in accordance with the present invention;

FIG. 11(*c*) is a schematic view of a channel and a slot frequency hopping OK packet data in accordance with the present invention;

FIG. 13(*a*) is a schematic view of a slave PA adjust packet data in accordance with the present invention;

FIG. 13(*b*) is a schematic view of a slave PA adjust Response packet data in accordance with the present invention;

FIG. 13(*c*) is a schematic view of a slave PA adjust OK packet data in accordance with the present invention.

FIGS. 14(*a*) and 14(*b*) are flow charts of making an emergency call by a master and a slave in accordance with the present invention;

FIGS. 18(a) and 18(b) are flow charts of pairing two new devices in accordance with the present invention;

FIG. 19(a) is a schematic view of linking an instruction packet data in accordance with the present invention;

FIG. 19(b) is a schematic view of linking and replying an instruction packet data in accordance with the present invention;

FIG. 19(c) is a schematic view of linking an OK instruction packet data in accordance with the present invention.

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
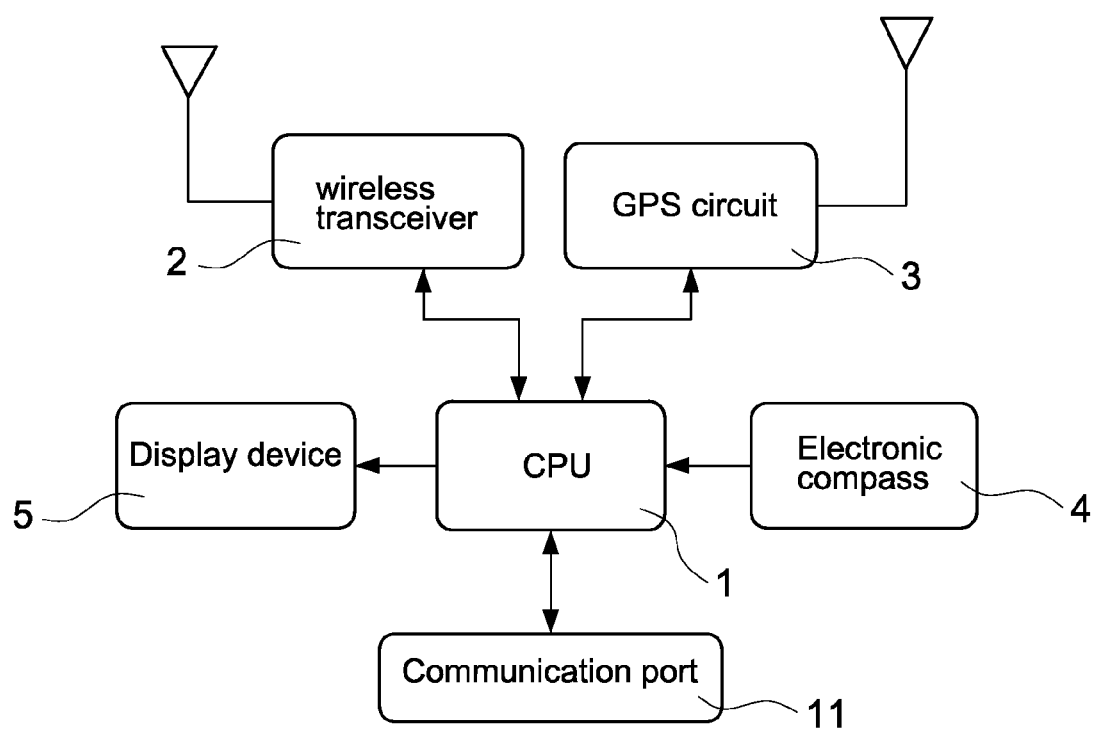
FIG. 1 is a schematic block diagram of an intercommunicated positioning device in accordance with the present invention.

Referring to FIG. 1 for a schematic block diagram of an intercommunicated positioning device in accordance with the present invention, the intercommunicated positioning device comprises: a central processing unit (CPU) 1, a wireless transceiver 2, a global positioning system (GPS) circuit 3, an electronic compass 4 and a display device 5.

The CPU 1 is provided for controlling an external circuit and an internal operation, and executing an external instruction. The CPU is electrically coupled to a communication port 11, for receiving a command and a response (such as pairing, linking, data report, and emergency call, etc) outputted by an external hardware.

The wireless transceiver 2 is electrically coupled to the CPU 1 for transmitting a signal outputted by the CPU 1 to another intercommunicated positioning device, or receiving a signal transmitted by another intercommunicated positioning device.

The GPS circuit 3 is electrically coupled to the CPU 1 for receiving a coordinate position signal into the CPU 1.

The electronic compass 4 is electrically coupled to the CPU 1 for providing angle information of a geomagnetic north pole or a geomagnetic south pole of the device to the CPU 1.

The display device 5 is electrically coupled to the CPU 1 and driven by the CPU 1 for displaying the linked information and the position information of several intercommunicated positioning devices.

The communication port is electrically coupled to the CPU 1 for receiving an external command of the CPU, an external signal from a satellite or a signal from the electronic compass.

The aforementioned intercommunicated positioning devices perform a many-to-may crosslink communication positioning allocation, and the circuits and programs of each intercommunicated positioning device are the same, and thus only one of the devices needs to be set as a master by the crosslink positioning communication method, and the remaining ones are slaves.

Figure 2:
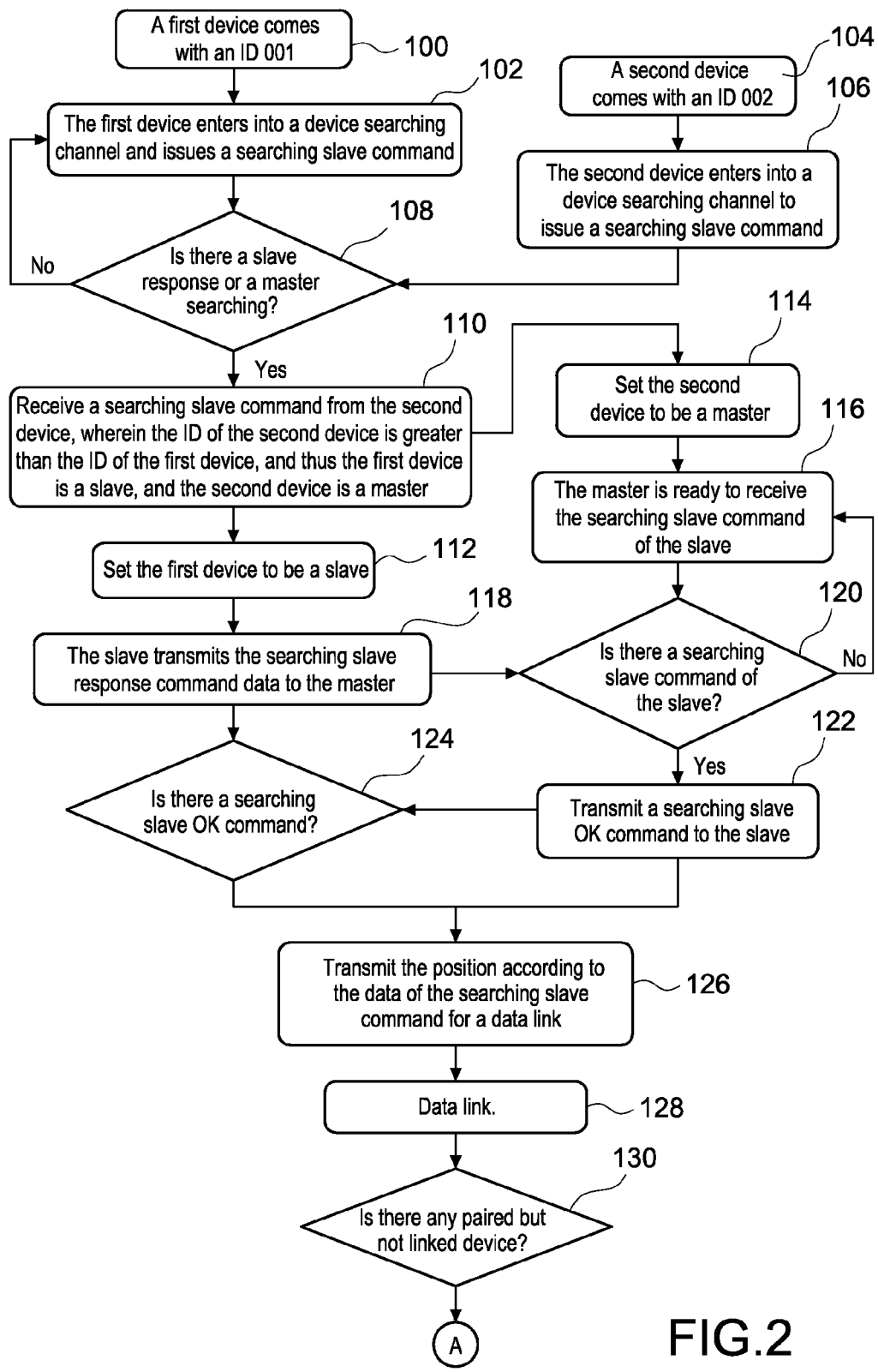
FIG. 2 is a flow chart of entering each device into its respective allocated position in accordance with the present invention.
Figure 3:
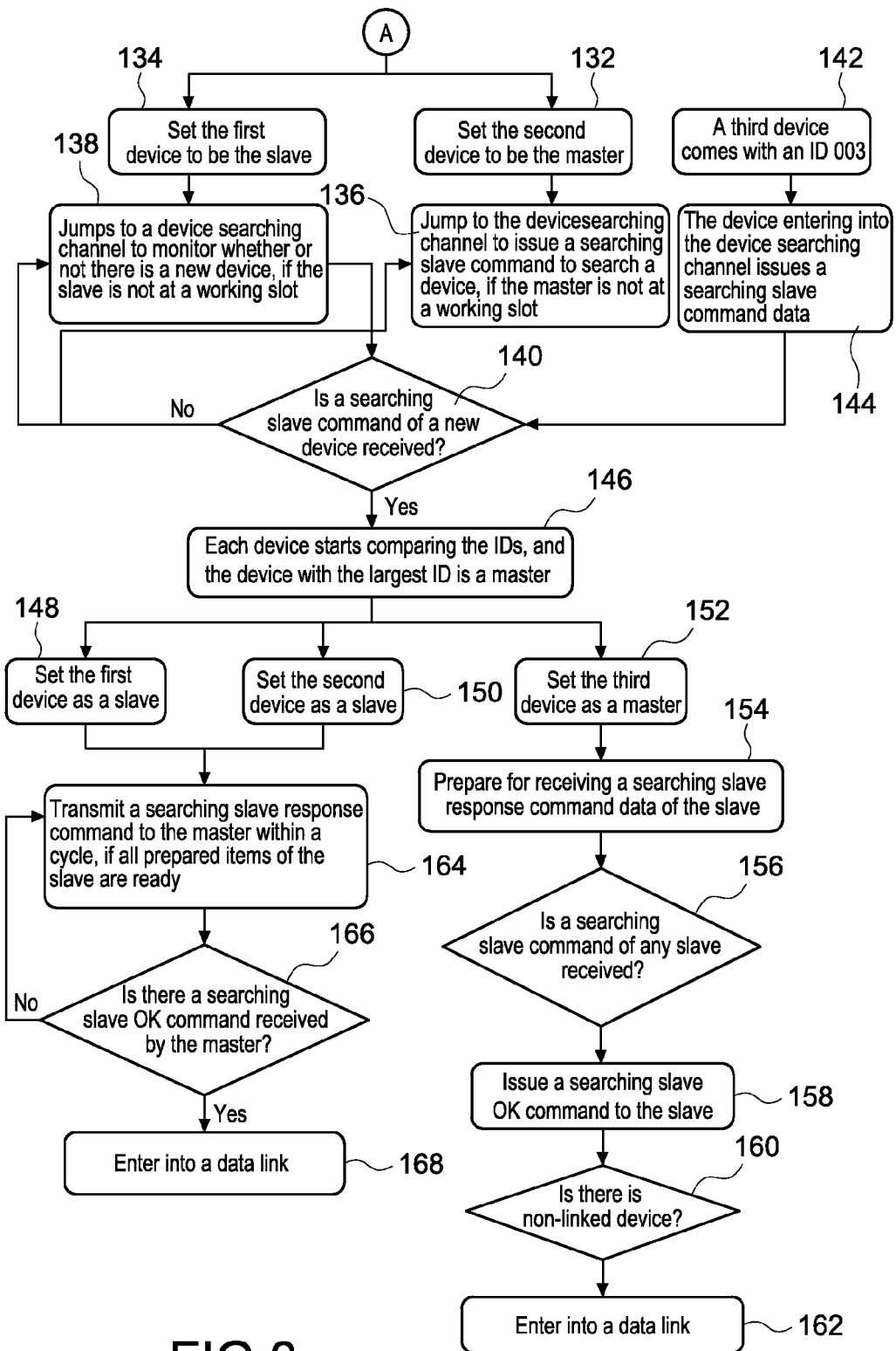
FIG. 3 is a continued flow chart of FIG. 2.

Referring to FIGS. 2 and 3 for flow charts of entering each device into its allocated position, two devices are allocated and compared, and a first device with an ID 001 enters into Step 100.

Step 102: The first device enters into a device searching channel and issues a searching slave command. In the figures, the searching slave command packet data comprises: a data length, a device type, a device ID, a searching slave field, a slave ID, a master slot, a master data num, a GPS Fix or Not, a working channel, and a working slot as shown in FIG. 4(a), and the packet format can vary with the requirements of different systems.

In the meantime, the second device with an ID 002 enters into Step 104.

Step 106: The second device enters into a device searching channel to issue a searching slave command. In the figures, the searching slave command packet data comprises: a data length, a device type, a device ID, a searching slave field, a slave ID, a master slot, a master data num, a GPS Fix or Not, a working channel and a working slot as shown in FIG. 4(a), and the packet format can vary with the requirements of different systems.

Step 108: Wait and see whether or not there is a slave response or a master searching. If there is no slave response or master searching, then return to Step 102; if there is a slave response or master searching, then go to Step 110 to receive a searching slave command from the second device, wherein the ID of the second device is greater than the ID of the first device, and thus the first device is a slave, and the second device is a master.

Step 112: Set the first device to be a slave.

Step 114: Set the second device to be a master.

Step 116: The master is ready to receive the searching slave command of the slave.

Step 118: The slave transmits the searching slave response command data to the master. In the figure, the searching slave response command packet data comprises: a data length, a device type, a device ID, a searching slave response field, a slave slot, a slave data num, and a GPS Fix or Not as shown in FIG. 4(b), and the packet format can vary with the requirements of different systems.

Step 120: Wait and see whether or not there is a searching slave command of the slave. If there is no searching slave command of the slave, then return to Step 116. If there is a searching slave command data, then go to Step 122 to transmit a searching slave OK command to the slave. In the figure, the searching slave OK command packet data comprises: a data length, a device type, a device ID, a searching code, a slave ID, a master slot, a master data num, and a GPS Fix or Not as shown in FIG. 4(c), and the packet format can vary with the requirements of different systems.

Step 124: Wait and see whether or not there is a searching slave OK command. If there is a searching slave OK command, then go to Step 126, and the next cycle will transmit the position according to the data of the searching slave command for a data link, and go to Step 128 for the data link.

Step 130: Determine whether or not there is a paired but not linked device. If no, then return to Step 128; and if yes, then go to Step 132 for the master, and Step 134 for the slave.

After the master enters into Step 132, go to Step 136. If the master is not at a working slot, then jump to the device searching channel to issue a searching slave command to search a device, and then go to Step 140 to determine whether or not a searching slave command of a new device is received. If there is no searching slave command of a new device, then return to Step 136.

If the slave enters into Step 138 and is not at a working slot, then the slave jumps to a device searching channel to monitor whether or not there is a new device, and then go to Step 140 to determine whether or not a searching slave command of a new device is received.

If a third device with an ID 003 enters into Step 142, the device entering into the device searching channel issues a searching slave command data in Step 144.

Go to Step 140 to determine whether or not a searching slave command from a new device is received. Go to Step 146, and each device starts comparing the IDs, and the device with the largest ID is the master. Therefore, the first device is a slave (Step 148), and the second device is a slave (Step 150) and the third device is a master (Step 152).

If the third device is a master, then go to Step 154, and prepare for receiving a searching slave response command data of the slave.

Go to Step 156 to determine whether or not a searching slave command of any slave is received. If no searching slave command of a slave is received, then return to Step 154. If a searching slave command of a slave is received, then go to Step 158, and issue a searching slave OK command to the slave.

Go to Step 160 to determine whether or not there is a non-linked device. If there is a non-linked device, then return to Step 144. If there is a device to be linked, then go to Step 162, and enter into the next cycle for a data link.

If the first device in Step 148 and the second device in Step 150 are slaves, then go to Step 164. If all prepared items of the slave are ready, a searching slave response command is transmitted to the master within a cycle as shown in FIG. 4(*b*), and the packet format can vary with the requirements of different systems.

Go to Step 166 to determine whether or not there is a searching slave OK command received by the master as shown in FIG. 4(*c*), and the packet format can vary with the requirements of different systems. If no searching slave OK command is received by the master, then return to Step 164. If a searching slave OK command is received by the master, then go to Step 168 and enter into the next cycle for a data link.

Figure 5A:
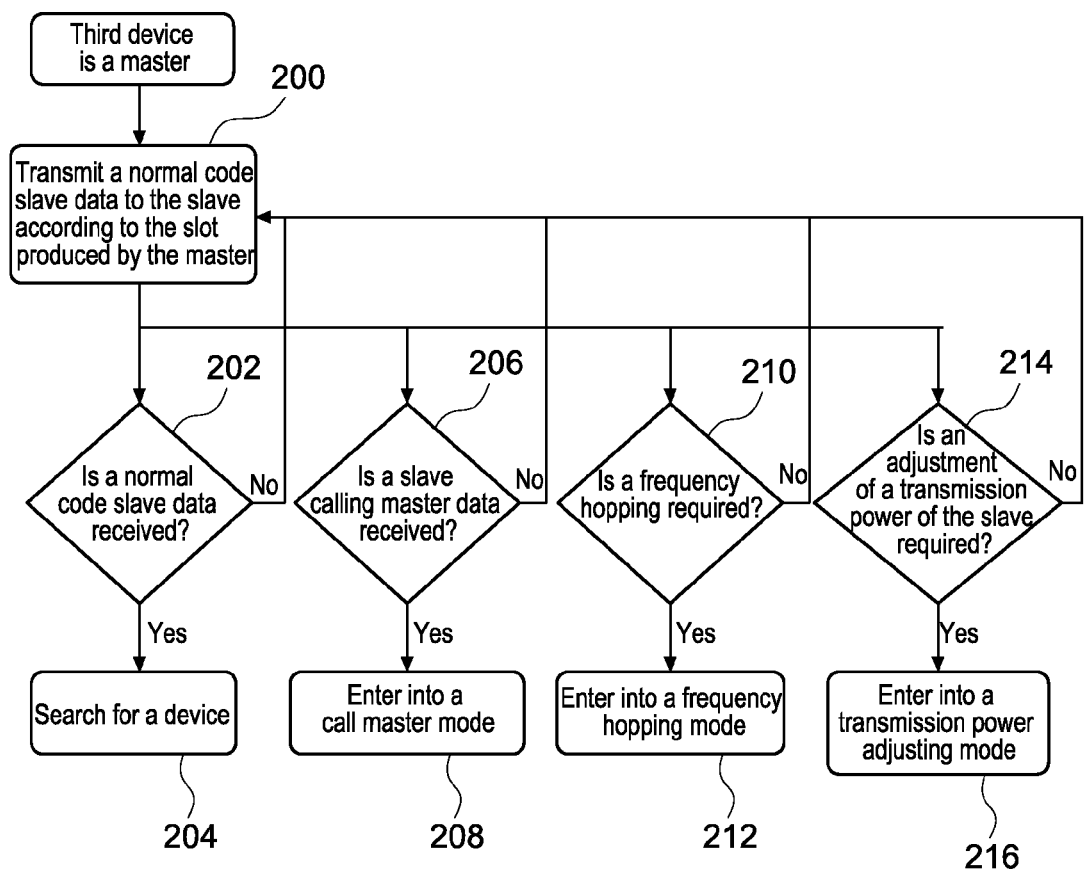
FIGS. 5(*a*) and 5(*b*) are flow charts of linking data of a master and a slave in accordance with the present invention.
Figure 5B:
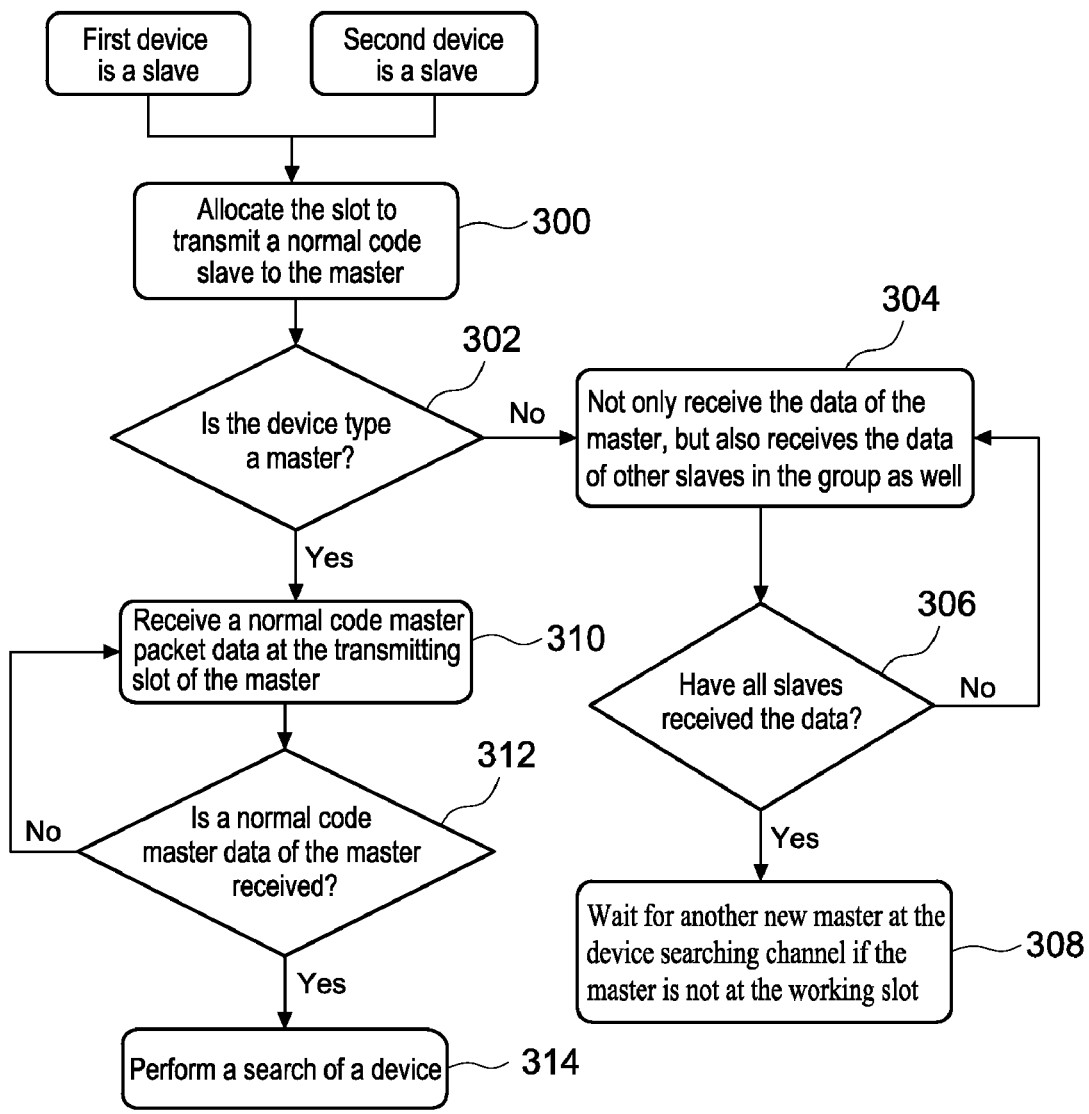

Referring to FIGS. 5(*a*) and 5(*b*) for flow charts of performing a data link of a master and a slave in accordance with the present invention, the master (or the third device) performs a data link to the slave as shown in Step 200, and transmits a normal code slave data to the slave according to the slot produced by the master. Then, go to Step 202 to determine whether or not a normal code slave data is received. If no normal code slave data is received, then return to Step 200. If a normal code slave data is received, then go to Step 204 to search for a device. In the figure, the normal code slave packet data comprises: a data length, a device type, a device ID, a normal code slave field, a longitude, latitude, a PA Level, a slave channel, slave slot, a slave data num, and a GPS Fix or Not as shown in FIG. 6(*a*), and the packet format can vary with the requirements of different systems.

After Step 200, go to Step 206 to determine whether or not a slave calling master data is received. If no slave calling master data is received, then return to Step 200. If a slave calling master data is received, then go to Step 208 to enter into a call master mode. In the figure, the slave calling master packet data comprises: a data length, a device type, a device ID, a slave calling master field, a longitude, a latitude, a slave channel, a slave slot, a slave data num, a GPS Fix or Not as shown in FIG. 6(*b*), and the packet format can vary with the requirements of different systems.

After Step 200, go to Step 210 to determine whether or not a frequency hopping is required. If it is determined that no frequency hopping is required, then return to Step 200. If it is determined that a frequency hopping is required, then go to Step 212 to enter into a frequency hopping mode.

After Step 200, go to Step 214 to determine whether or not an adjustment of a transmission power of the slave is required. If no adjustment of the transmission power of the slave is required, then return to Step 200. If an adjustment of the transmission power of the slave is required, then go to Step 216 to enter into a transmission power adjusting mode.

When the slave (first device and second device) performs a data link with another slave as shown in Step 300, the master allocates the slot to transmit a normal code slave to the master.

Step 302 determines whether or not the device type is a master. If the device type is determined to be not a master, then go to Step 304, wherein not only the data of the master is received, but the data of other slaves in the group is received as well. Then, go to Step 306 to determine whether or not all slaves have received the data. If it is determined that not all slaves have received the data, then return to the Step 304. If it is determined that all slaves have received the data, then go to Step 308, and wait for another new master at the device searching channel if the master is not at the working slot.

If the device in Step 302 is determined to be a master, then go to Step 310 and receive a normal code master packet data at the transmitting slot of the master as shown in FIG. 6(*c*), and the packet format can vary with the requirements of different systems.

In Step 312, determine whether or not a normal code master data of the master is received. If it is determined that no normal code master data is received, then return to Step 310. If it is determined that a normal code master data is received, then perform the search of a device.

Figure 7A:
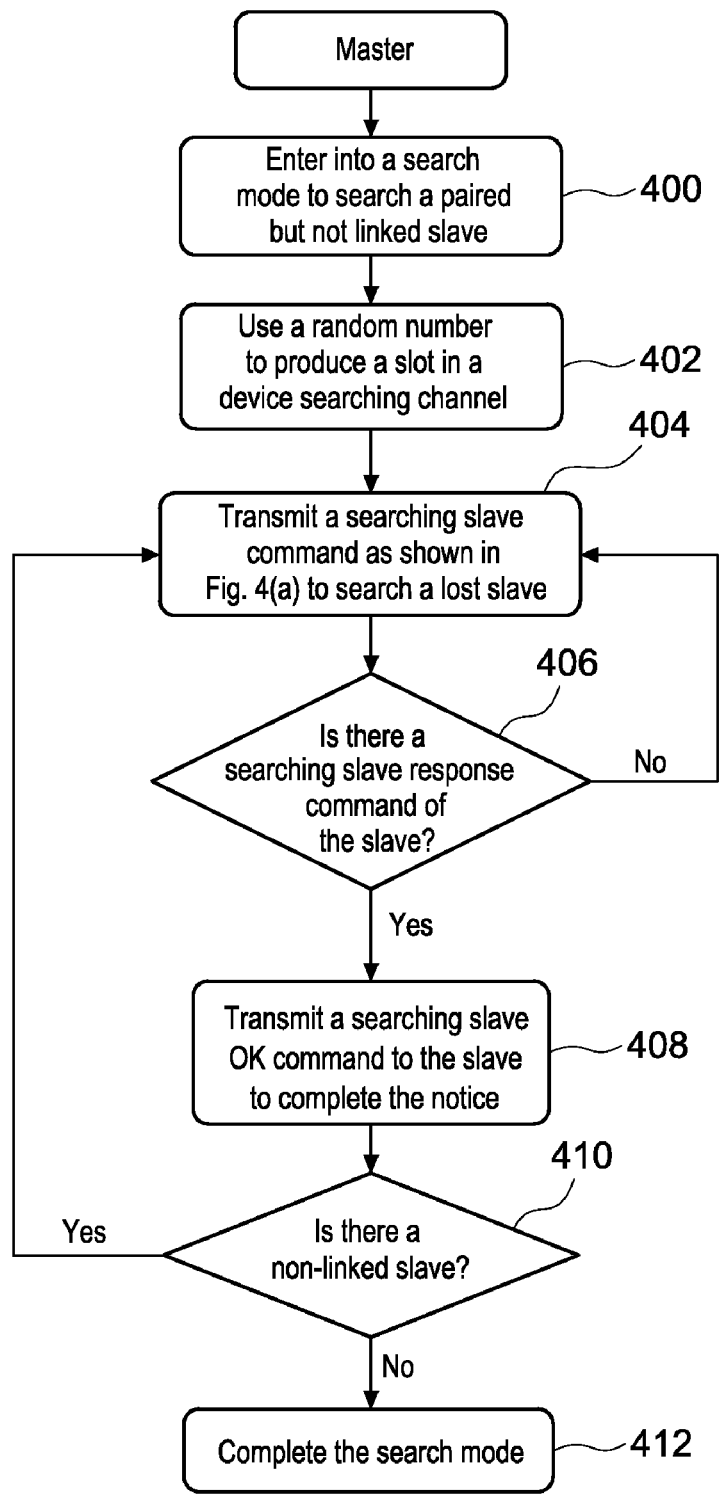
FIGS. 7(*a*) and 7(*b*) are flow charts of performing a search by a master and a slave in accordance with the present invention.
Figure 7B:
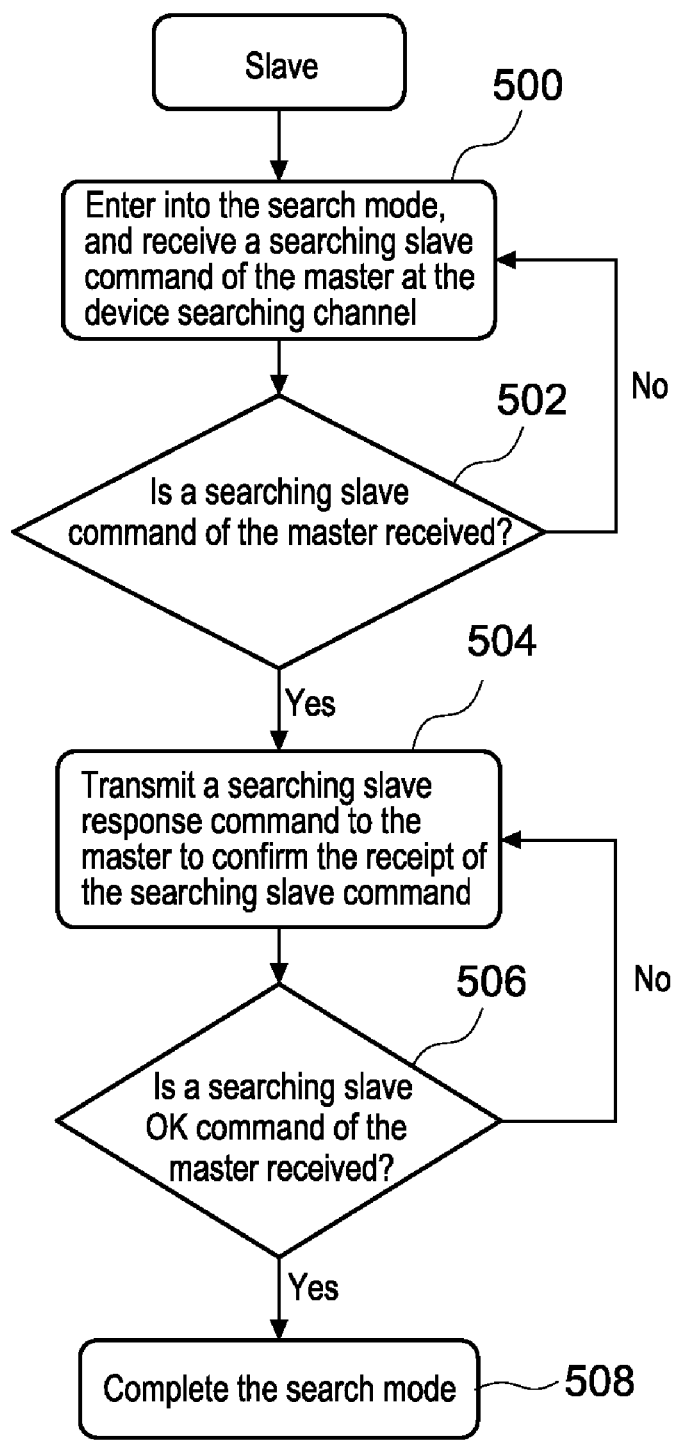

Referring to FIGS. 7(*a*) and 7(*b*) for flow charts of performing a search by a master and a slave in accordance with the present invention; a master performs a search in Step 400, and enters into a search mode to search a paired but not linked slave.

Step 402: Use a random number to produce a slot in a device searching channel.

Step 404: Transmit a searching slave command as shown in FIG. 4(*a*) to search a lost slave.

Step 406: Determine whether or not there is a searching slave response command of the slave as shown in FIG. 4(*b*), and the packet format can vary with the requirements of different systems. If there is no searching slave response command, then return to Step 404; if there is a searching slave response command, then go to Step 408 to transmit a searching slave OK command as shown in FIG. 4(*c*) to the salve to complete the notice, and the packet format of the slave can vary according to the requirements of different systems.

Step 410: Determine whether or not there is a non-linked slave. If there is a non-linked slave, then return to Step 404; and if there is no non-linked slave, then go to Step 412 to complete the search mode.

When the slave performs a search as shown in Step 500, the search mode is entered, and a searching slave command of the master is received at the device searching channel.

Step 502: Determine whether or not a searching slave command of the master is received. If it is determined that no searching slave command of the master is received, then return to Step 500. If it is determined that a searching slave command of the master is received, then go to Step 504.

Step 504: Transmit a searching slave response command to the master to confirm the receipt of the searching slave command.

Step 506: Determine whether or not a searching slave OK command of the master is received. If it is determined that no searching slave OK command of the master is received, then return to Step 504. If it is determined that a searching slave OK command of the master is received, then go to Step 508 to complete the search mode.

Figure 8A:
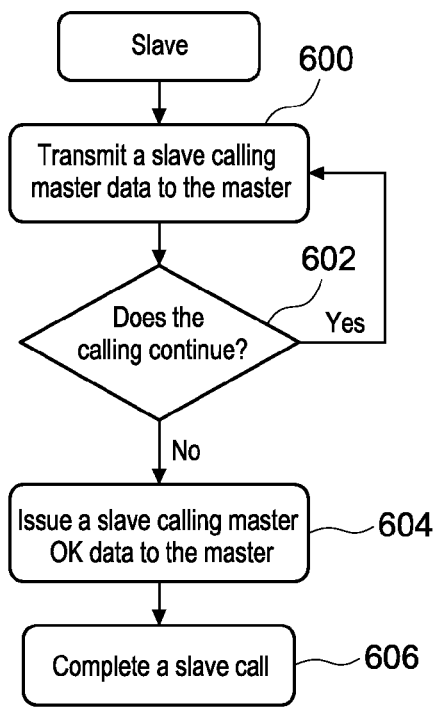
FIGS. 8(*a*) and 8(*b*) are flow charts of calling by a master and a slave in accordance with the present invention.
Figure 8B:
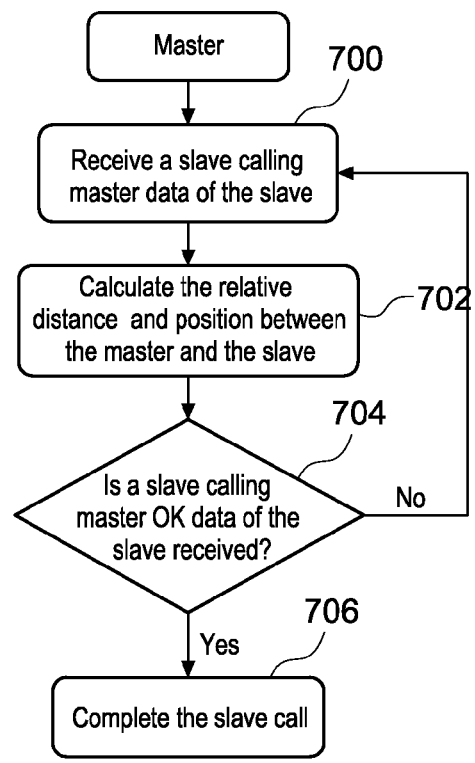

Referring to FIGS. 8(*a*) and 8(*b*) for flow charts of calling by a master and a slave in accordance with the present invention, when a slave calls a master as shown in Step 600, a slave calling master data is transmitted to the master.

Step 602: Determine whether or not the calling continues. If the calling continues, then return to Step 602. If the calling stops, then go to Step 604 to issue a slave calling master OK data to the master. Then, go to Step 606 to complete a slave call. In the figure, the slave calling master OK packet data comprises: a data length, a device type, a device ID, a slave calling master field, a slave channel, a slave slot, a slave data num, and a GPS Fix or Not as shown in FIG. 9, and the packet format can vary with the requirements of different systems.

As to the master as shown in Step 700, a slave calling master data of the slave is received.

Step 702: Calculate the relative distance and position between the master and the slave.

Step 704: Determine whether or not a slave calling master OK data of the slave is received. If it is determined that no slave calling master OK data of the slave is received, then return to Step 700. If it is determined that a slave calling master OK data of the slave is received, then go to Step 706 to complete the slave call.

Figures 10A, 10B:
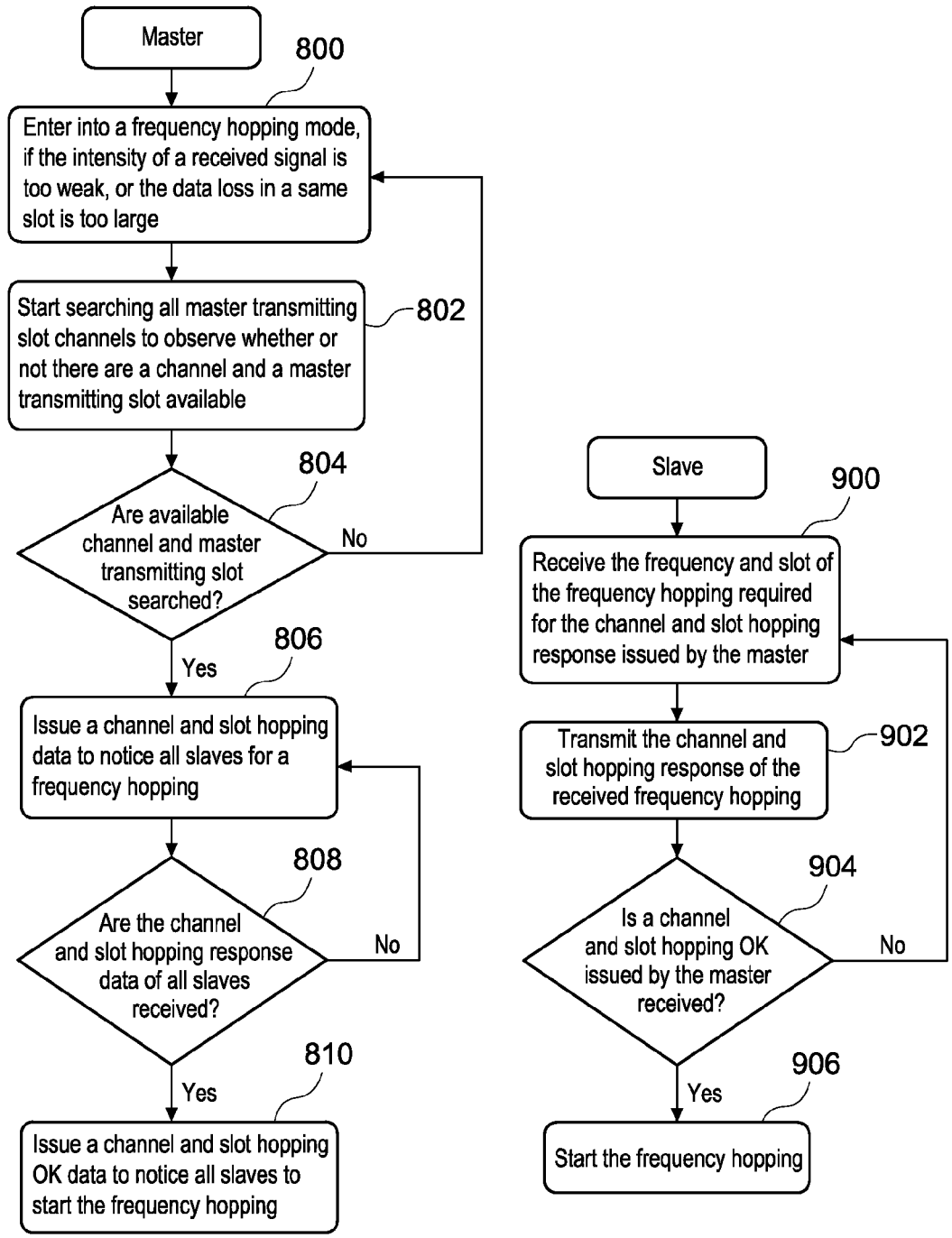
FIG. 10(*a*) and 10(*b*) are flow charts of a frequency hopping mode in accordance with the present invention.

Referring to FIG. 10(*a*) and 10(*b*) for flow charts of a frequency hopping mode in accordance with the present invention, the master as shown in Step 800 is at a frequency hopping mode, and when the intensity of a received signal is too weak, or the data loss in a same slot is too large, then enter into a frequency hopping mode.

Step 802: Start searching all master transmitting slot channels to observe whether or not there are a channel and a master transmitting slot available.

Step 804: Determine whether or not available channel and master transmitting slot are searched. If no channel and master transmitting slot are available, return to Step 802. If it is determined that available channel and master transmitting slot are searched, then go to Step 806.

Step 806: Issue a channel and slot hopping data to notice all slaves for a frequency hopping. The channel and slot hopping packet data comprises: a data length, a device type, a device ID, a hopping code, a master channel, a master slot, a master data num, a next channel, a next slot, and a GPS Fix or Not as shown in FIG. 11(*a*), and the packet format can vary with the requirements of different systems.

Step 808: Determine whether or not the channel and slot hopping response data of all slaves are received. If it is determined that no channel and slot hopping response data of all slaves is received, then return to Step 806. If it is determined that the channel and slot hopping response data of a slave is received, then go to Step 810. In the figure, the channel and slot hopping response packet data comprises: a data length, a device type, a device ID, a channel and slot hopping response field, a slave channel, a slave slot, a slave data num, a GPS Fix or Not as shown in FIG. 11(*b*), and the packet format can vary with the requirements of different systems.

Step 810: Issue a channel and slot hopping OK data to notice all slaves to start the frequency hopping. In the figure, the channel and slot hopping OK packet data comprises: a data length, a device type, a device ID, a channel and slot hopping OK field, a master channel, a master slot, a master data num, and a GPS Fix or Not as shown in FIG. 11(*c*), and the packet format can vary with the requirements of different systems.

As to the slave as shown in Step 900, the frequency and slot of the frequency hopping required for the channel and slot hopping response issued by the master is received.

Step 902: Transmit the channel and slot hopping response of the received frequency hopping.

Step 904: Determine whether or not a channel and slot hopping OK issued by the master is received. If it is determined that no channel and slot hopping OK issued by the master is received, then return to Step 902. If it is determined that a channel and slot hopping OK issued by the master is received, then go to Step 906, and start the frequency hopping at the next cycle.

Figure 12A:
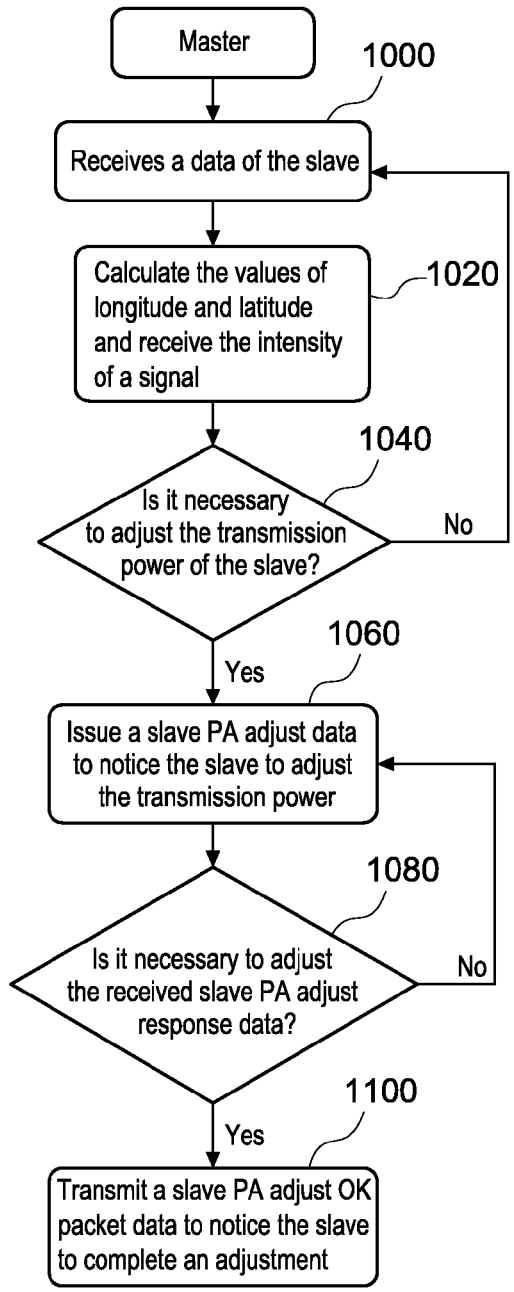
FIGS. 12(*a*) and 12(*b*) are flow charts of adjusting the transmission power of a slave in accordance with the present invention.
Figure 12B:
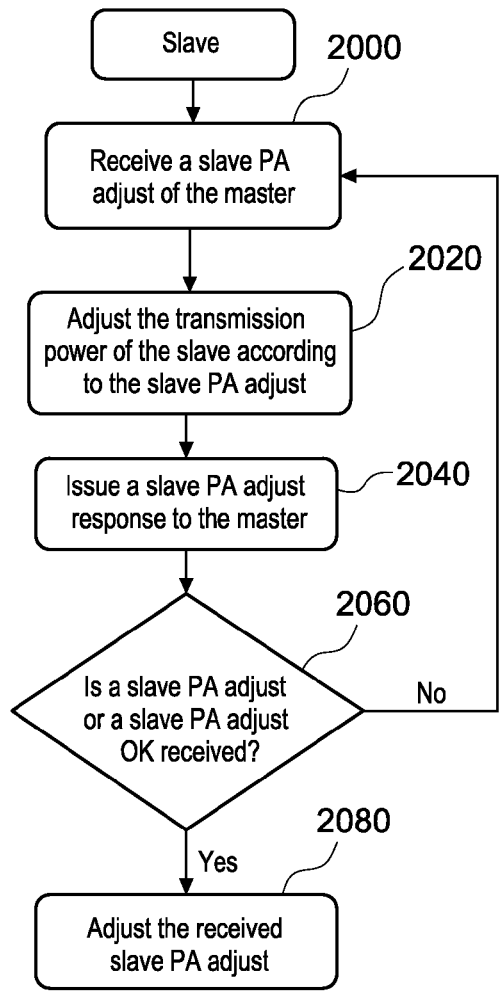

Referring to FIGS. 12(*a*) and 12(*b*) for flow charts of adjusting the transmission power of a slave in accordance with the present invention, the master as shown in Step 1000 receives a data of the slave.

Step 1020: Calculate the values of longitude and latitude and receive the intensity of a signal.

Step 1040: Determine whether or not it is necessary to adjust the transmission power of the slave. If it is determined that no adjustment to the transmission power of the slave is required, return to Step 1020. If it is determined that an adjustment to the transmission power of the slave is required, then go to Step 1060 to issue a slave PA adjust data to notice the slave to adjust the transmission power. In the figure, the slave PA adjust packet data comprises: data length, device type, device ID, PA Adjust, master channel, master slot, master data num, slave ID, PA Level, GPS Fix or Not, as shown in FIG. 13(*a*), the packet format can vary with the requirements of different systems.

Step 1080: Determine whether or not it is necessary to adjust the received slave PA adjust response data. If it is determined that an adjustment is required, return to Step 1060. If it is determined that no adjustment is required, then go to Step 1100. In the figure, the slave PA adjust response packet data comprises: a data length, a device type, a device ID, a PA Adjust, a slave PA adjust response field, a master channel, a master slot, a master data num, and a GPS Fix or Not as shown in FIG. 13(*b*), and the packet format can vary with the requirements of different systems.

Step 1100: Transmit a slave PA adjust OK packet data to notice the slave to complete an adjustment. The slave PA adjust OK packet data comprises: a data length, a device type, a device ID, a PA adjust, a slave PA adjust OK field, a master channel, a master slot, a master data num, a slave ID and a GPS Fix or Not as shown in FIG. 13(*c*), and the packet format can vary with the requirements of different systems.

The slave as shown in Step 2000 receives a slave PA adjust of the master.

Step 2020: Adjust the transmission power of the slave according to the slave PA adjust.

Step 2040: Issue a slave PA adjust response to the master.

Step 2060: Determine whether or not a slave PA adjust or a slave PA adjust OK is received. If it is determined that a slave PA adjust is received, return to Step 2000. If it is determined that a slave PA adjust OK is received, then go to Step 2080 to adjust the received slave PA adjust.

Referring to FIGS. 14(*a*) and 14(*b*) for flow charts of making an emergency call by a master and a slave in accordance with the present invention, the master emergency call as shown in Step 3000 enters into the emergency call mode to disable all using functions.

Figures 14A, 14B, 15:
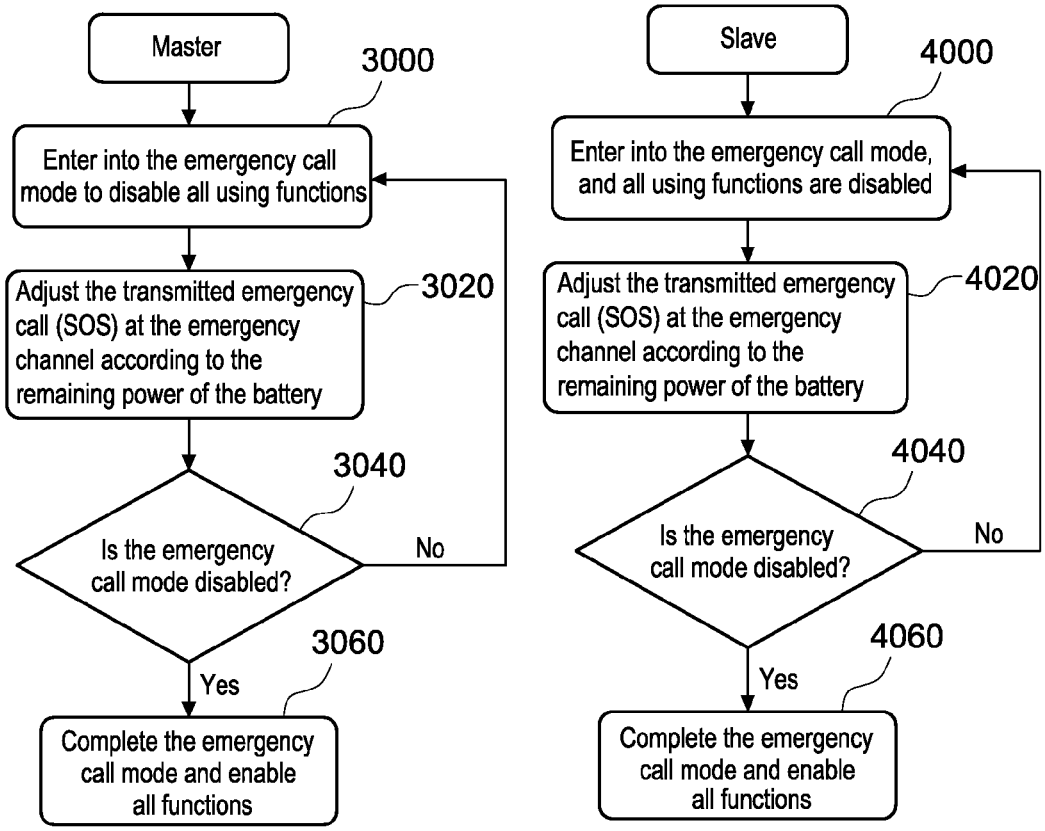
FIG. 15 is a schematic view of an emergency call packet data in accordance with the present invention.

Step 3020: the transmitted emergency call (SOS) is adjusted at the emergency channel according to the remaining power of the battery. The emergency call (SOS) packet data comprises: a data length, a longitude, latitude and a device ID as shown in FIG. 15, and the packet format can vary with the requirements of different systems.

Step 3040: Determine whether or not the emergency call mode is disabled. If it is determined that emergency call mode is enabled, then return to Step 3020. If it is determined that emergency call mode is disabled, then go to Step 3060 to complete the emergency call mode and enable all functions.

The slave emergency call as shown in Step 4000 enters into the emergency call mode, and all using functions are disabled.

Step 4020: Adjust the transmitted emergency call (SOS) at the emergency channel according to the remaining power of the battery.

Step 4040: Determine whether or not the emergency call mode is disabled. If it is determined that emergency call mode is enabled, then return to Step 4020. If it is determined that the emergency call mode is disabled, then go to Step 4060 to complete the emergency call mode and enable all functions.

Figure 16:
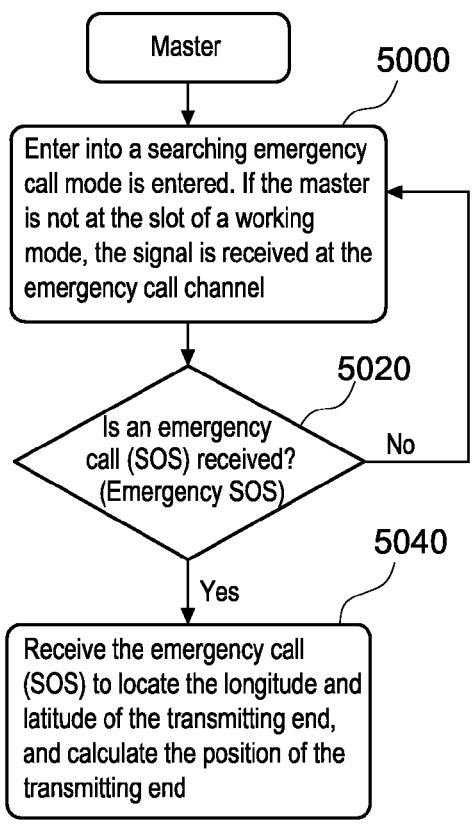
FIG. 16 is a flow chart of searching an emergency call in accordance with the present invention.

Referring to FIG. 16 for a flow chart of searching an emergency call in accordance with the present invention, the master is operated at a normal mode, and an emergency call signal is searched. If the master is turned on as shown in Step 5000, a searching emergency call mode is entered. If the master is not at the slot of a working mode, the signal is received at the emergency call channel.

Step 5020: Determine whether or not an emergency call (SOS) is received. If it is determined that no emergency call (SOS) signal is received, then return to Step 5020. If it is determined that an emergency call (SOS) is received, then go to Step 5040 to receive the emergency call (SOS) to locate the longitude and latitude of the transmitting end, and calculate the position of the transmitting end.

Figure 17:
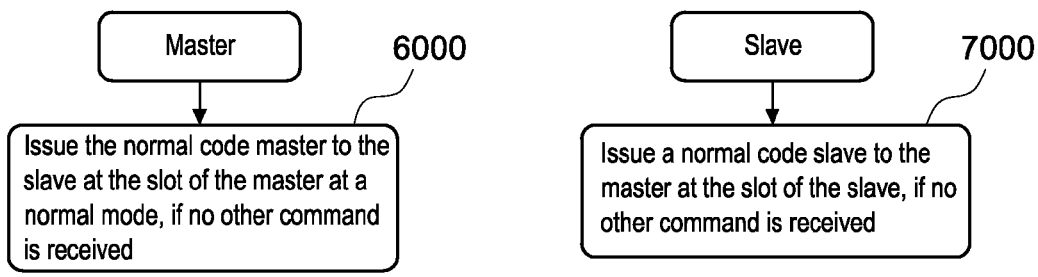
FIG. 17 is a flow chart of correcting time in accordance with the present invention.

Referring to FIG. 17 for a flow chart of correcting time in accordance with the present invention, the master operated at a normal mode constantly issues a normal code to the slave, so that the slave knows about the existence of the master and both slave and master can check the time.

Therefore, if the master operated at a normal mode as shown in Step 6000 receives no other commands, the master will issue the normal code master to the slave at the slot of the master.

If the slave operated at the normal mode as shown in Step 7000 receives no other command, the slave will issue a normal code slave to the master at the slot of the slave.

Referring to FIGS. 18(*a*) and 18(*b*) for flow charts of pairing two new devices in accordance with the present invention, the master as shown in Step 8000 uses a random number to produce a slot at a bind channel.

Step 8020: Receive a binding command packet data according to the slot transmission binding command, and the binding command packet data comprises: a data length, a device type, a device ID, a binding field, a master slot, a master data num, a working channel, a working slot, and a GPS Fix or Not as shown in FIG. 19(*a*), the packet format can vary with the requirements of different systems.

Step 8040: Determine whether or not a binding response command of the slave is received. If it is determined that no binding response command of the slave is received, return to Step 8020. If it is determined that a binding response command of the slave is received, then go to Step 8060. In the figure, the binding response command packet data comprises: a data length, a device type, a device ID, a binding response field, a slave slot, a slave data num and a GPS Fix or Not as shown in FIG. 19(*b*), and the packet format can vary with the requirements of different systems.

Step 8060: Transmit a binding OK command after the binding response command from the slave is received. The binding OK command packet data comprises: a data length, a device type, a device ID, a binding OK field, a master slot, a master data num and a GPS Fix or Not as shown in FIG. 19(*c*), and the packet format can vary with the requirements of different systems.

The slave as shown in Step 9000 enters into a bind channel and gets ready to receive a binding command of the master.

Step 9020: Determine whether or not a binding command of the master is received. If it is determined that no binding command of the master is received, return to Step 9000. If it is determined that a binding command of the master is received, then go to Step 9040 to transmit a binding response command to the master after the binding command of the master is received.

Step 9060: Determine whether or not a binding OK command of the master is received. If it is determined that no binding OK command of the master is received, return to Step 9040. If it is determined that a binding OK command of the master is received, then go to Step 9080 to complete pairing after the binding OK command of the master is received.

Figures 20A, 20B:
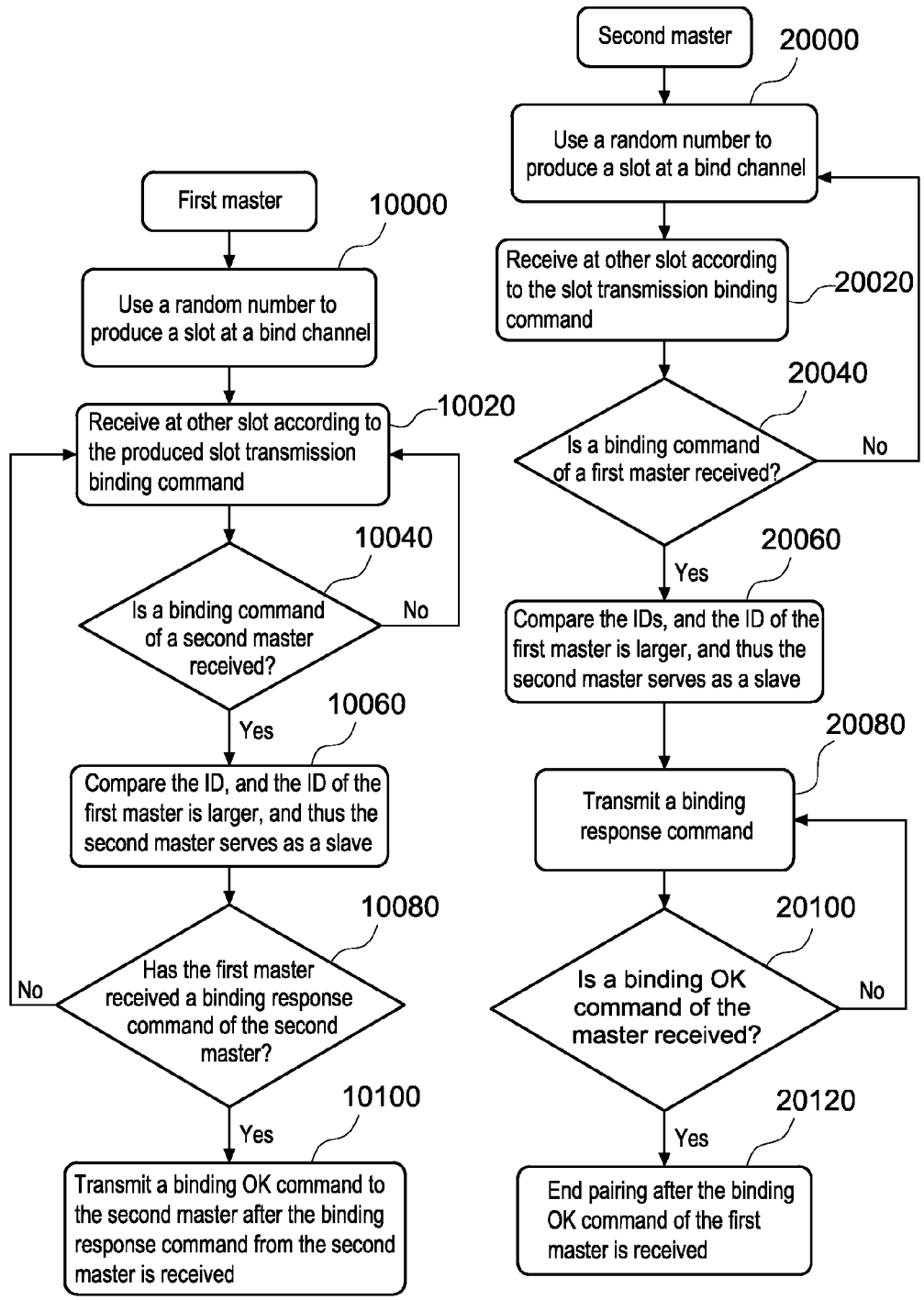
FIGS. 20(a) and 20(b) are flow charts of pairing another two new devices in accordance with the present invention.

Referring to FIGS. 20(*a*) and 20(*b*) for flow charts of pairing another two new devices in accordance with the present invention, a first master as shown in Step 10000 uses a random number to produce a slot at a bind channel.

Step 10020: Receive at other slot according to the produced slot transmission binding command.

Step 10040: Determine whether or not a binding command of a second master is received. If it is determined that no binding command of the second master is received, return to Step 10020. If it is determined that binding command of the second master is received, then go to Step 10060 to compare the ID, and the ID of the first master is larger, and thus the second master serves as a slave.

Step 10080: Determine whether or not the first master has received a binding response command of the second master. If it is determined that no binding response command of the second master is received, return to Step 10020. If it is determined that a binding response command of the second master is received, then go to Step 10100.

Step 10100: Transmit a binding OK command to the second master after the binding response command from the second master is received.

The second master as shown in Step 20000 uses a random number to produce a slot at a bind channel.

Step 20020: Receive at other slot according to the slot transmission binding command.

Step 20040: Determine whether or not a binding command of a first master is received. If it is determined that no binding command of a first master is received, return to Step 20020. If it is determined that a binding command of a first master is received, then go to Step 20060 to compare the IDs, and the ID of the first master is larger, and thus the second master serves as a slave.

Step 20080: Transmit a binding response command.

Step 20100: Determine whether or not a binding OK command of the master is received. If it is determined that no binding OK command of the master is received, return to Step 20080. If it is determined that a binding OK command of the master is received, then go to Step 20120 to end pairing after the binding OK command of the first master is received.

After the foregoing allocation is completed, several intercommunicated positioning devices can be allocated such that one device serves as the master, and the remaining devices serves as the slaves in a communication positioning mode, and such devices can be applied to calls or emergency calls (mountain climbing rescues) for a group (such as a car team or a mountain climbing team).

While the invention is described in by way of example and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A crosslinked positioning method for multiple intercommunicated positioning devices comprising the steps of:
   establishing for a plurality of users a respective plurality of mobile positioning devices operable for direct intercommunication therebetween;
   performing a search by at least one of the intercommunicated positioning devices;
   receiving an ID of at least one other of the intercommunicated positioning device;
   setting one of the intercommunicated positioning devices as a master, and at least one other of the intercommunicated positioning devices as a slave according to a comparison of the IDs thereof;
   crosslinking data of the master and the slave; and
   displaying positions of both the master and slave simultaneously on a screen at each of the intercommunicated positioning devices.

2. The method of claim 1, wherein each of the intercommunicated positioning devices comprises:
   a central processing unit (CPU), for controlling an external circuit and an internal operation and executing an external instruction;
   a wireless transceiver, electrically coupled to the CPU, for transmitting a signal outputted by the CPU to the other intercommunicated positioning devices, and receiving a signal transmitted from the other intercommunicated positioning devices;
   a GPS circuit, electrically coupled to the CPU, for providing coordinates position information to the CPU;
   an electronic compass, electrically coupled to the CPU, for providing angle information of a geomagnetic north pole or geomagnetic south pole to the CPU; and
   a display device, electrically coupled to the CPU.

3. The method of claim 1, wherein the slave jumps to a device searching channel to monitor whether or not there is a new device, if the slave is not at a working slot.

4. The method of claim 1, wherein the master jumps to a device searching channel to issue a searching slave command for searching another device, if the master is not a working slot.

5. The method of claim 1, further comprising the steps of: transmitting a normal code slave to the master according to a slot allocated by the master when a data link takes place between slaves; and determining the device type to be not a master, wherein not only the data of the master is received, but the data of other slaves in the group are also received.

6. The method of claim 1, wherein the master and the slave perform a data link at a mode selected from the collection of a search mode, a call mode, a frequency hopping mode, a transmission power adjusting mode and a correction time mode.

7. The method of claim 6, wherein the search mode searches the paired but not linked slave, and uses a random number to produce a slot in the device searching channel, and the slave receives a command from the master in the device searching channel and replies to the command of the master.

8. The method of claim 6, wherein the call mode comprises: a calling master, an emergency call and a searching emergency call.

9. The method of claim 8, wherein if the master is called, then a slave calling master will be received, and the master will calculate the relative distance and positions of the master and the slave.

10. The method of claim 8, wherein, the functions being used by the master and slave are disabled during the emergency call, and the emergency call is transmitted according to the level of the remaining electric power.

11. The method of claim 8, wherein the searching emergency call locates the longitude and latitude of the transmitting end when the master receives an emergency call signal, and calculates the position of the transmitting end.

12. The method of claim 6, wherein the frequency hopping mode is entered, if the intensity of the received signal is too small, or the data loss in a same slot is too large, and the master issues a frequency hopping signal to the slave for performing a frequency hopping.

13. The method of claim 12, wherein the frequency hopping mode is entered, if the data loss is too large.

14. The method of claim 6, wherein the transmission power adjusting mode is entered after the master receives the slave data, and the values of longitude and latitude and the intensity of the received signal are calculated, and the slave is noticed to adjust the transmission power according to the calculated result.

15. The method of claim 6, wherein the master operated at a normal mode constantly sends a normal code to the slave in the correction time mode, so that the slave knows that the master is still in the link status for checking the time of the slave and the master.

16. The method of claim 1, further comprising a pairing mode, and the pairing mode includes non-linked master and slave, and non-linked master and master.

17. The method of claim 16, wherein, the master uses a random number to produce a slot in a bind channel when the non-linked master and slave are paired, and the slave enters into the link slot of the master in the bind channel, and completes pairing the non-linked master and slave after replying to the master.

18. The method of claim 16, wherein the two masters use a random number to generate a slot in the bind channel when the non-linked masters are paired, and after a link signal is transmitted according to the produced slot, the IDs of the two masters are compared to set one of the non-linked devices as a master, and the other one as a slave.

* * * * *